US011576409B2

(12) United States Patent
Flick et al.

(10) Patent No.: US 11,576,409 B2
(45) Date of Patent: Feb. 14, 2023

(54) METHOD FOR PREPARING A FOODSTUFF WITH A FOOD PROCESSING SYSTEM

(71) Applicant: SOCIETE DES PRODUITS NESTLE S.A., Vevey (CH)

(72) Inventors: Jean-Marc Flick, Pomy (CH); Youcef Ait Bouziad, Echandens (CH); Fabien Ludovic Agon, Valeyres-sous-Rances (CH); Sheldon Fernandes, La Tour-de-Peilz (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/757,860

(22) PCT Filed: Oct. 17, 2018

(86) PCT No.: PCT/EP2018/078373
§ 371 (c)(1),
(2) Date: Apr. 21, 2020

(87) PCT Pub. No.: WO2019/081294
PCT Pub. Date: May 2, 2019

(65) Prior Publication Data
US 2021/0186068 A1 Jun. 24, 2021

(30) Foreign Application Priority Data
Oct. 24, 2017 (EP) ................................. 17198027

(51) Int. Cl.
*A23L 5/10* (2016.01)
*A23P 20/20* (2016.01)
(Continued)

(52) U.S. Cl.
CPC ................. *A23L 5/15* (2016.08); *A23P 20/20* (2016.08); *H05B 6/687* (2013.01); *A23V 2002/00* (2013.01)

(58) Field of Classification Search
CPC .......... A23L 5/15; A23P 20/20; H05B 6/687; H05B 6/686
See application file for complete search history.

(56) References Cited

U.S. PATENT DOCUMENTS 3,474,209 A * 10/1969 Parker .................... H05B 6/782
219/696
5,567,459 A * 10/1996 Gonzalez-Hernandez ..................
A21D 8/06
426/237

(Continued)

FOREIGN PATENT DOCUMENTS

WO 2016196939 12/2016

*Primary Examiner* — Ericson M Lachica
(74) *Attorney, Agent, or Firm* — K&L Gates LLP

(57) ABSTRACT

The invention relates to method for preparing a foodstuff in a food processing system (100), the system comprising solid state radio frequency cooking means (51) that transmits an electromagnetic wave to a food substrate and a cavity where the food is cooked, the method monitoring the return power losses, which are the difference between the power emitted by the solid state radio frequency cooking means (51) and the reflected power in the cavity, for optimising the delivery of the radio frequency power to the food substrate by controlling and adjusting at least two parameters: the emitted frequency of the solid state radio frequency cooking means (51) and the distance of the cooking means (51) to the food substrate. In the method of the invention, the dielectric properties, the water content and/or the compaction of the food substrate are monitored throughout the preparation method.

19 Claims, 8 Drawing Sheets

(51) Int. Cl.
*H05B 6/60* (2006.01)
*H05B 6/68* (2006.01)

(56) References Cited

U.S. PATENT DOCUMENTS

| | | |
|---|---|---|
| 2013/0119054 A1 | 5/2013 | Ben-Shmuel et al. |
| 2013/0186887 A1 | 7/2013 | Hallgren et al. |
| 2014/0203012 A1 | 7/2014 | Corona et al. |
| 2015/0313273 A1* | 11/2015 | Stromotich ............ A23B 9/04 |
| | | 34/259 |
| 2015/0366006 A1 | 12/2015 | Ben-Shmuel et al. |
| 2016/0025350 A1* | 1/2016 | Goble .................... H05B 6/80 |
| | | 99/331 |
| 2016/0345389 A1 | 11/2016 | Torres et al. |
| 2017/0094995 A1* | 4/2017 | Eskamani ............ B05B 7/1422 |
| 2017/0196254 A1* | 7/2017 | Michiels ................. A23L 5/15 |
| 2017/0196255 A1* | 7/2017 | Michiels ............... A21D 13/22 |
| 2017/0253414 A1 | 9/2017 | Linton et al. |
| 2017/0265256 A1 | 9/2017 | Lanza et al. |
| 2019/0080886 A1* | 3/2019 | Kaplan .................... H03F 3/19 |
| 2020/0053844 A1* | 2/2020 | Erle ...................... H05B 6/686 |

* cited by examiner

METHOD FOR PREPARING A FOODSTUFF WITH A FOOD PROCESSING SYSTEM

CROSS REFERENCE TO RELATED APPLICATIONS

The present application is a National Stage of International Application No. PCT/EP2018/078373, filed on Oct. 17, 2018, which claims priority to European Patent Application No. 17198027.9, filed on Oct. 24, 2017, the entire contents of which are being incorporated herein by reference.

FIELD OF THE INVENTION

The present invention is directed to a method for preparing a foodstuff using a food processing system. The method comprises the steps of depositing and/or delivering food under a certain pattern and cooking and/or heating it in an optimized manner.

BACKGROUND OF THE INVENTION

At present, processed food is becoming more and more widely used in the pursuit of saving time and efforts. Present trends of processed foods require that it is made more healthy and adapted to each individual's needs, that it is more convenient and the least number of processing operations is required from the consumer and, even more, that the waste is minimised so only the quantity of food to be consumed is ideally prepared.

A possibility for preparing tailored food adapted to each individual's needs would be to directly configure, departing from raw ingredients, the food that will be further cooked into a ready-to-eat meal. A food processing system based on layer deposition and layer cooking by layers belonging to the applicant was already filed under EP 15166200.4.

Personalized food systems at home require a lot of automation in a highly confined environment. This high degree of integration requires to minimize the size of the commercialized machine, which leads to new challenges when the cooking capability is added. Conventional cooking methodologies like those used in conventional ovens equipped with thermal resistances or infrared lamps or microwave cooking technologies based on magnetron technologies cannot be used due to the number of surrounding features which are sensitive to heat and to electromagnetic waves. In addition, conventional microwave technology is not a preferred option as it requires a dedicated cavity with no metal part located in it.

Therefore, cooking in food processing systems departing from raw food material presents a huge challenge. Thanks to the new developed technologies and their evolution in the last years, opportunities have raised for cooking food within the same environment as the one which is used to prepare it: in such scenario, the system is made much more compact as there are no actuators needed to move the prepared dish or food form one station to the cooking station, as the preparation station and the cooking station are the same. This allows to decrease the final cost of the machine by keeping a high degree of integration.

Preferably, the cooking technology used in the food processing system of the invention is based on the solid state microwave technology allowing the generation of high electromagnetic energy which can be directed towards the food material to cook it. In comparison with the traditional microwave cavity in which only the level of power and the time can be used to control the cooking propensity, the cooking technology based on solid state microwave provides a direct feedback on the cooking process: by monitoring the level of reflected power, the phase differences between the emitted signal and the reflected signal, it is possible to determine the nature of the food, the level of water which has been evaporated and eventually the temperature of the food material. Still, this technology remains complex and the cooking parameters have to be tailor-made for each type of food product.

Moreover, in order to provide a homogeneous and optimized cooking of the deposited food layers, as these layers grow throughout the cooking process, it is also desirable to provide a system which takes these changes into account. Furthermore, as the characteristics of the food material (dielectric properties, compaction, etc.) also change by being subjected to the cooking process, it would be desirable to also adapt the cooking parameters throughout the cooking process, in order to provide a satisfactory end result. The present invention provides a method for preparing a foodstuff in a food processing system which takes this into account.

OBJECT AND SUMMARY OF THE INVENTION

According to a first aspect, the invention refers to a method for preparing a foodstuff in a food processing system: the system comprises solid state radio frequency cooking means that transmits an electromagnetic wave to a food substrate and a cavity where the food is cooked, the method monitoring the return power losses, which are the difference between the power emitted by the solid state radio frequency cooking means and the reflected power in the cavity, for optimising the delivery of the radio frequency power to the food substrate by controlling and adjusting at least two parameters: the emitted frequency of the solid state radio frequency cooking means and the distance of the cooking means to the food substrate.

The method of the invention typically monitors the dielectric properties, the water content and/or the compaction of the food substrate throughout the preparation method.

The method of the invention preferably activates the solid state radio frequency cooking means simultaneously or successively to the deposition of the one or plurality of layers or layer by layer, the system where the method is carried out being configured for reconstituting food from powdered raw food material which is deposited in the cavity on one or a plurality of layers.

The method according to the present invention preferably comprises an initial step of pre-setting the solid state radio frequency cooking means by scanning a certain range of emitted frequency of the cooking means at a certain distance of the cooking means to the food substrate, taking the frequency at which the return power losses are maximum and adjusting the distance of the cooking means to the food substrate to take the distance at which the return power losses are maximum. According to a possible embodiment, the initial pre-setting step is repeated several times in the method of the invention.

Preferably, in the method of the invention the distance from the solid state radio frequency cooking means to the food substrate is maintained substantially constant throughout the foodstuff preparation. The distance from the cooking means to the food substrate is typically the distance providing maximum return power losses, at a certain emitted frequency of the cooking means.

In the method according to the present invention, the solid state radio frequency cooking means preferably shift their frequency to adapt it to the change of the foodstuff properties throughout the preparation method, to maintain maximum return power losses.

The method of the invention further typically monitors the variation of the foodstuff surface colour to stop the preparation once a certain defined threshold is reached.

The method of the present invention typically operates a system comprising at least a deposition head dispensing the foodstuff in one or a plurality of layers onto a deposition area, the method typically adjusting the distance of the cooking means to the deposition area by relatively moving the cooking means and the area in height.

Preferably, the method of the invention operates a system further comprising an infrared generator, the method typically selectively activating this generator throughout the preparation process for the browning of at least part of the foodstuff prepared.

The system operated by the method of the present invention typically further comprises secondary cooking means to cook the lower surface of the foodstuff deposited, the method preferably selectively activating these secondary cooking means for cooking and/or browning at least part of the lower surface of the foodstuff deposited.

The method according to the present invention typically further activates the secondary cooking means for cooking and/or browning the first foodstuff layer deposited, and further activates the infrared generator for browning the last one of the foodstuff layers deposited.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF EXEMPLARY EMBODIMENTS

Conventional microwave ovens are fast and convenient for heating food products at home scale, but provide however a non-uniform cooking. When using solid state microwave technology, the heating or cooking provided is also fast and convenient but provides however a great advantage: its sensing capability allows monitoring the reflected power throughout the electromagnetic waveguide (antenna), this capability allows the adjustment of the power and the frequency and thus provides a much more homogeneous food cooking.

The usage of this technology is particularly advantageous when preparing personalized food as it is the object of the invention, where a dish or meal is reconstituted from food powder material.

The convenience of food processing systems as the one used in the method of the invention resides not only on the variety of the proposed and personalized meals but also on the promptness of the dish preparation. For example, a complete snack or dish can be prepared in 1 to 3 minutes. A cooking technology which is able to operate quickly and in a focused and reliable way is needed for these personalized food systems. The capability of the microwave cooking technology to volumetrically heat food it is the most appropriate technology to decrease the cooking processing time.

Apart from decreasing the cooking time, it is also needed to provide prepared foodstuff homogenously and optimally cooked, in the desired way (this does not mean that all the deposited food layers are cooked in the same way, or even they can be cooked differently within a same layer area, but the cooking provided needs to be as desired). Because the layers grow with time when cooked and further change their properties, this needs to be taken into consideration and the cooking parameters, particularly the distance of the cooking means to the layer being cooked needs to be maintained substantially constant.

The system used in the method of the invention uses the same cavity or chamber to prepare and to cook the meal: thus, a complete meal can be prepared in the same cavity which means that a variety of dishes can be cooked at different temperature levels and can cohabit with other ambient dishes. Advantageously, the method of the invention uses solid state microwave technology (SSD) allowing to focus and direct the electromagnetic energy towards the deposited food layers thanks to the specific shape of its electromagnetic waveguide.

Figure 1:
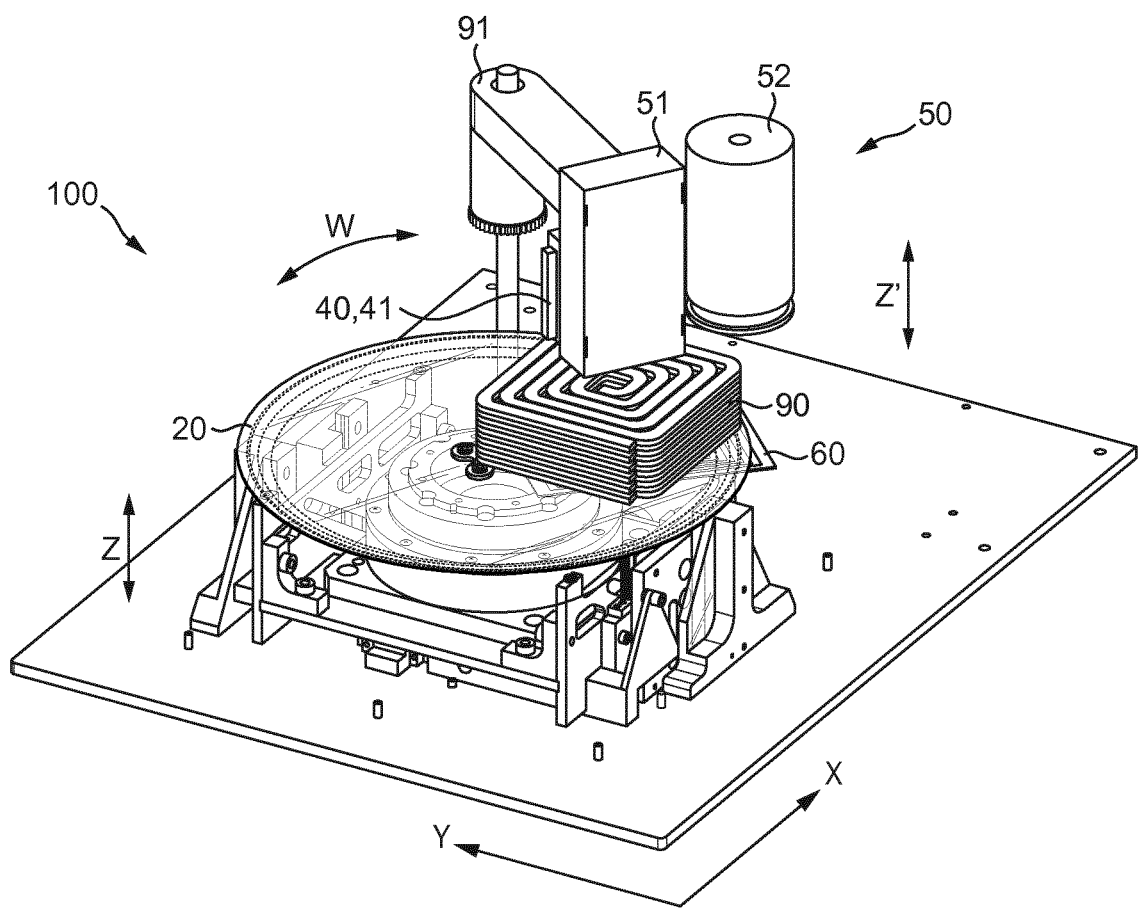
FIG. 1 shows a general view of a food processing system operating a method for preparing a foodstuff according to the present invention.

With reference to FIG. 1, the method of the invention uses a food processing system 100 comprising cooking means 50: the cooking means 50 further comprise a solid state radio frequency cooking device 51, comprising a microwave antenna and an amplifier, and an infrared generator 52. The food processing system 100 comprises at least one (preferably more than one) deposition head (not shown in the Figures) that deposit one or a plurality of shapes and/or layers 90 onto a deposition surface 20. Preferably, in the system of the invention, the deposition head is configured for reconstituting food from powdered raw food material before depositing it (shapes and/or layers 90) onto the deposition surface 20. The deposition head (or the plurality of heads) can be either moved together with the cooking means 50 (that is, the deposition head is attached to the cooking means 50) or it can be arranged separately, and thus following a separate moving path. Preferably, the food deposition surface 20 is made circular and the movement of the cooking means 50 and of the deposition head (or heads) will pass through the center of this circumference.

Typically, once deposited, the solid state radio frequency cooking system 51 comes to heat and/or cook at least part of these deposited shapes and/or layers 90, one by one; however, another possibility is that the cooking or heating of the deposited layers is done simultaneously to their deposition. In a more general way, the food processing system 100 comprises cooking means 50, these cooking means typically comprising a solid state radio frequency cooking system 51 and also an infrared generator 52. The solid state radio frequency system 51 cooks in depth/volume the layer of food deposited, while the infrared generator 52 is used to provide a surface cooking or browning of the layer deposited. Therefore, typically, once the deposition of one layer has been done onto the deposition surface 20, the cooking means 50 will come to heat and/or cook the deposited layer. Typically, the deposition surface 20 and the cooking means 50 are made moveable with respect to each other. A preferred embodiment of the system will have the deposition surface 20 rotatable according to W and also moveable in height according to Z (see FIG. 1). Besides, the cooking means 50 (comprising typically both the solid state system 51 and the infrared generator 52) will be rotatable according to W' and will also be moveable in height according to Z'. The displacement in height of the cooking means 50 and of the deposition surface 20 shall be synchronised in order to follow the deposition of the layers to adjust and maintain constant the distance from the cooking means 50 to the deposited food layers onto the surface 20. A certain distance from the food to the cooking means is adjusted at the beginning of the cooking process (this distance providing an optimal cooking) and then it is maintained throughout the entire cooking process. Sensing means 40 are provided for measuring the distance of the cooking means 50 to the food surface deposited throughout the cooking process: further, control means 41 ensure that the distance of the cooking means 50 to the deposited food surface is kept substantially constant throughout said cooking process.

In order to provide a homogeneous cooking and to maximize the transfer of the electromagnetic energy into the deposited food volume, it is required to keep a defined distance between the deposition surface 20 and the cooking means 50, more precisely between the deposited food layer and the cooking means 50. Therefore, it is required to either move the deposition surface 20 in height Z or the cooking means 50 (in the support 91 where they are arranged) in the vertical position Z' or both.

In order to control the distance between the cooking means 50 and/or the deposition surface 20 and/or the deposited food, the cooking means 50 typically comprise sensing means 40 (see FIG. 4) to control such distance. These sensing means are preferably non-contact distance sensors, typically comprising a reflective optical sensor.

The preferred mechanical setup of the system of the invention arranges the solid state radio frequency cooking system 51 and the infrared generator 52 in a support 91: both the SSD system 51 and the infrared generator 52 move solidarily and are able to displace vertically in height (Z') and can also rotate according to W'.

Depending on the food substance (particularly if it contains wheat flour or gluten), the growth of it will vary and will affect the energy transfer in a different way. Therefore, it is important to have a distance measuring sensor 40 that will monitor permanently the distance between the food surface and the cooking means 50 as well as a servo system 41 (configuring the control means) capable of automatically controlling this distance. This function can be achieved by using a simple reflective optical sensor like for example a TCRT5000 sensor, able to measure a distance typically between 1 to 20 mm.

The design of the waveguide from the solid state system 51 that transmits the electromagnetic wave to the food substrate is a critical part of the food processing system 100. The solid state radio frequency system 51 is typically configured as an antenna transmitting the most of the emitted electromagnetic energy: the part of the energy that is not transmitted transforms in heat energy directly into the waveguide or in the generator of the solid state radio frequency system 51; therefore, this energy should be minimized. Up to 10% of reflected energy is acceptable for the configuration of the invention as it is difficult to fully transmit the full microwave energy generated without a huge design effort.

The main challenge in a personalized food system is to be able to selectively heat and/or cook one part of the deposited food layer, i.e. one part of the prepared dish. This requires a highly focused electromagnetic energy which has to be transmitted to the food. The waveguide together with the food material form and electrical impedance that is highly dependent on the distance between the food and the antenna (solid state radio frequency system 51) as well as on the water content and on the dielectric properties of the food material.

The solid state radio frequency system 51 is configured to be able to shift its emitted frequency to adapt and maximize the electromagnetic energy transfer to the food product before the cooking process starts and then throughout the entire cooking process.

In fact, there are two main parameters the food processing system 100 of the invention works with: one is the emitted frequency of the solid state radio frequency system 51 that will be shifted to adapt and maximize the electromagnetic energy transfer to the food product, and another one is the distance from the cooking means 50 to the deposited food, which also provides a maximization of the energy transfer.

Thus, as already explained, the microwave generator of the solid state radio frequency system 51 will be able to shift its emitted frequency to maximize the electromagnetic transfer when the food material properties change with the cooking process (water losses and food material phase changes, for example). Furthermore, the radio frequency generators for the cooking on top and for the cooking on bottom will be able to control the phase of their emitted radio frequency signals to avoid radio frequency collisions when used in combination.

Figure 2:
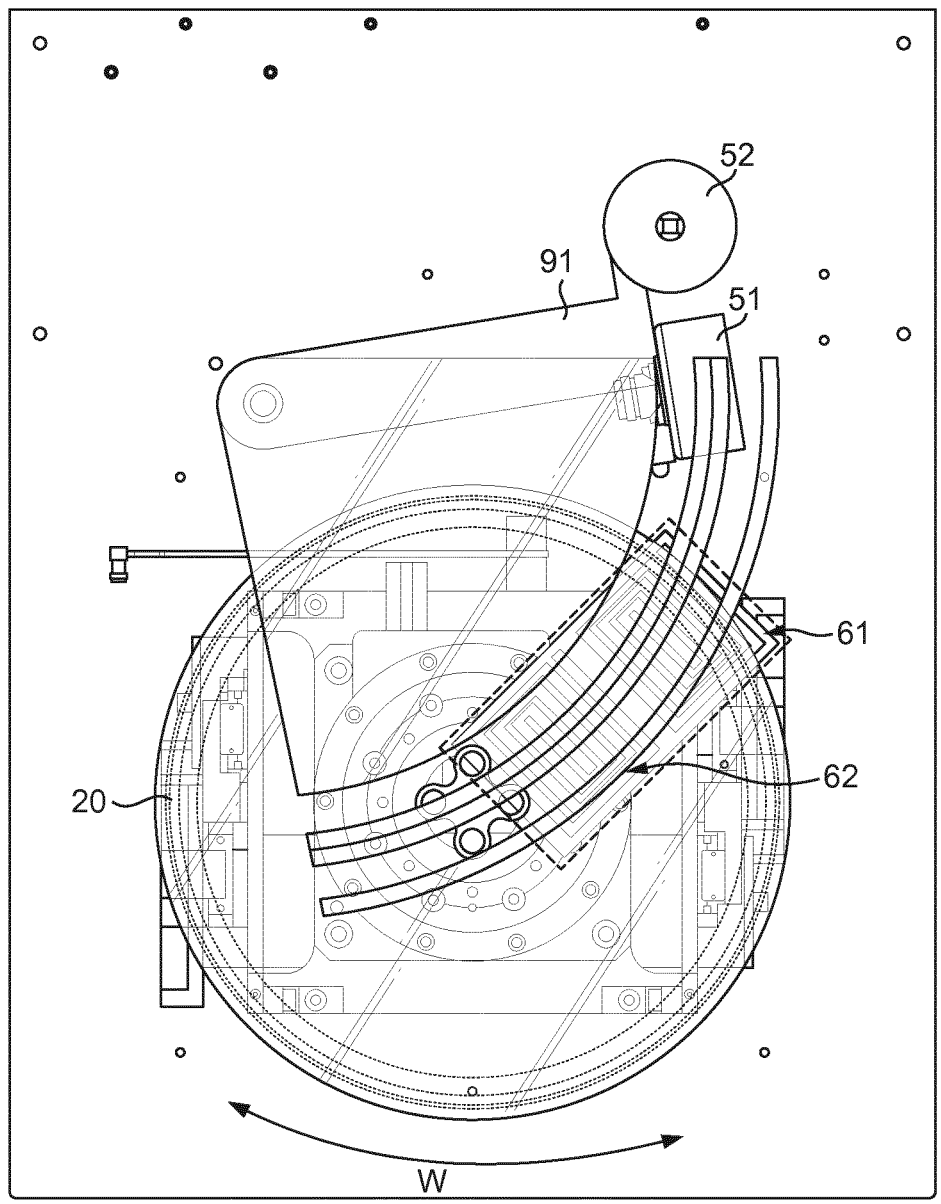
FIG. 2 shows a possible configuration of secondary cooking means with microwave antennas arranged below the deposition surface in a food processing system operating a method for preparing a foodstuff according to the present invention.

Moreover, in order to help cooking (minimizing the cooking time) and further in order to keep hot the already deposited and cooked food layers that will be on the lower part of the deposition surface 20, secondary cooking means 60 will typically be also provided in the surface 20. The secondary cooking means can heat up the surface 20 by direct heating using electrical resistances or by induction or by microwave, for example. FIG. 2 shows a possible configuration where the secondary cooking means 60 comprise two planar microwave antennas 61, 62 used to generate the electromagnetic field which will then cook the food form below.

Figure 3:
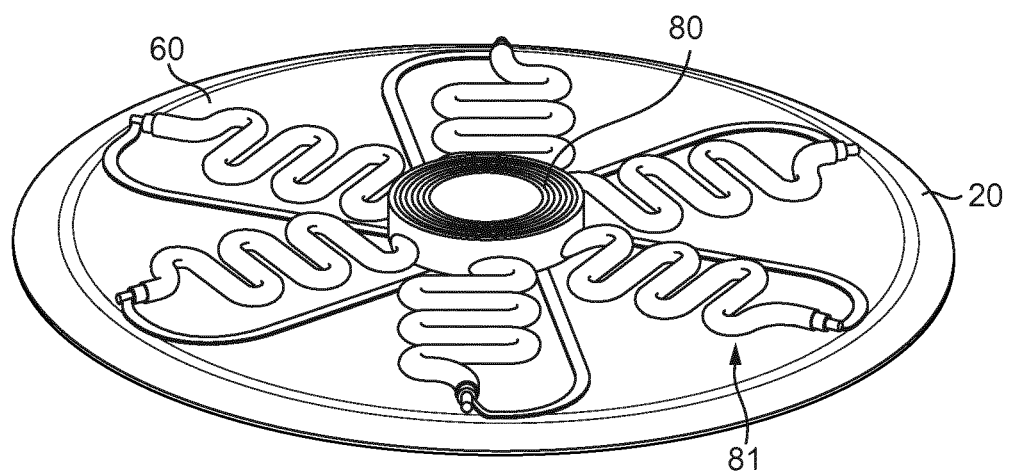
FIG. 3 show another possible configuration of secondary cooking means with electrical heating resistors arranged on the deposition surface in a food processing system operating a method for preparing a foodstuff according to the present invention.

Another possible configuration for the secondary cooking means 60 is to directly integrate electrical heating resistors 81 into the surface 20 (see FIG. 3). These electrical resistors can form a network from which different segments of it can be activated on demand. Each resistor 81 is collectively electrically connected at the centre of the deposition surface 20 by the common electrode or resistor 80.

As described, the advantage of using a solid state microwave system (transistor-based technology) is the microwave sensing capability: the emitted power, the reflected power and the electrical signal phase shift between both can be monitored. This allows to actively control the cooking process and develop a cooking strategy for maximizing the electromagnetic energy transfer towards the food.

The present invention is directed to an optimised method for preparing a foodstuff in a system 100 as the one described. This method works with a certain distance from the cooking means 50 to the food deposited on the surface 20, as described. The method of the invention ensures that the maximum of the emitted electromagnetic power from the solid state radio frequency system 51 will reach the food with an optimal yield. It is difficult to quantify the power absorbed by the food and the power that will be spread in the cooking cavity. The method of the invention is used to optimise the delivery of the radio frequency power to the food material by monitoring the return power losses, the return power losses being the difference between the emitted radio frequency power and the reflected radio frequency power.

Figure 4:
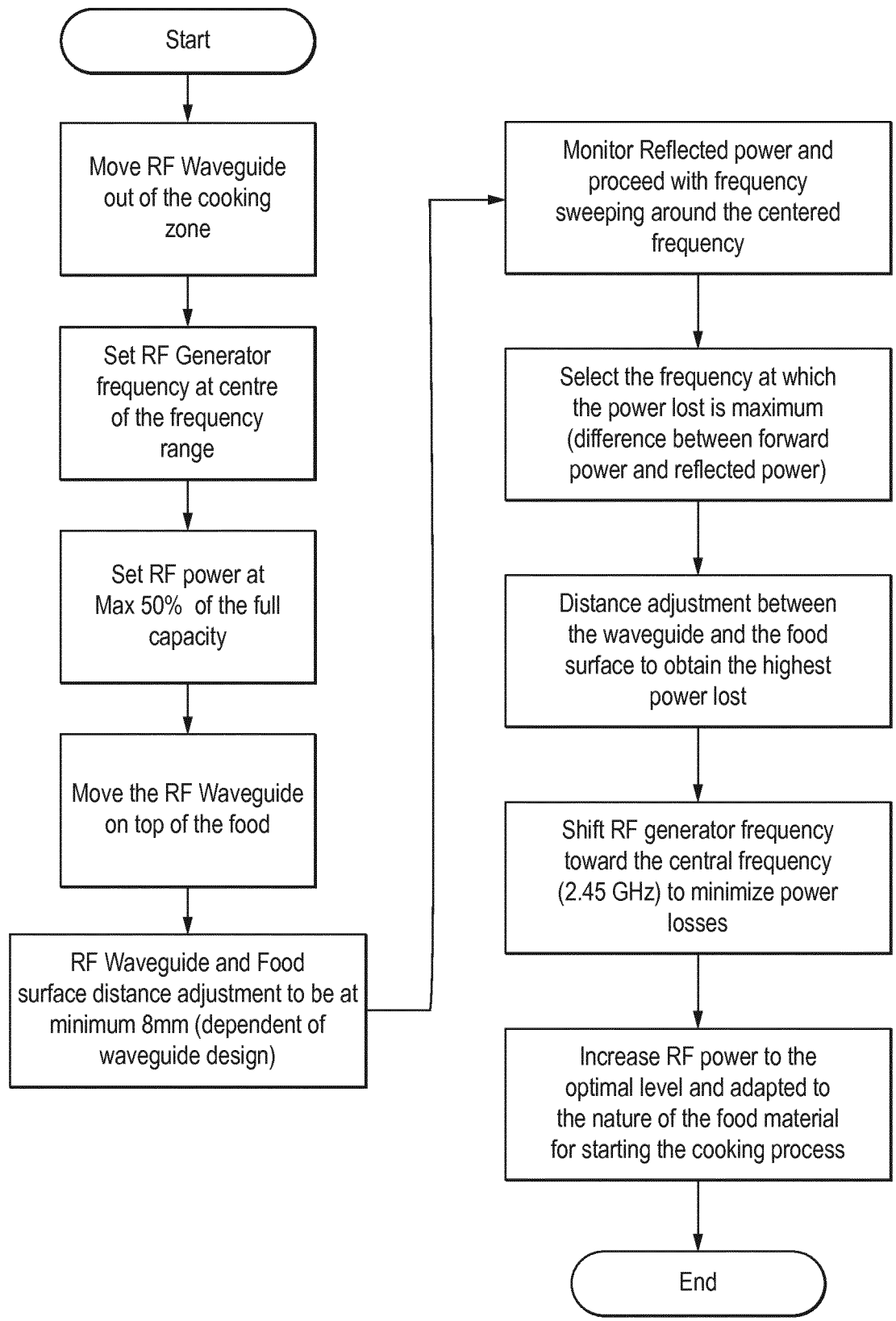
FIG. 4 shows a diagram representing the main steps to be carried out for setting up the parameters before starting the cooking process in a method for preparing a foodstuff according to the present invention.

FIG. 4 shows the steps previous to starting the cooking process, these steps being used to ensure the maximization of the radio frequency power delivered to the food. Before starting cooking, the aim is to establish (to set) the optimal distance of the cooking means 50 to the surface 20 (to the food deposited therein): the optimal distance is the one providing maximum absorbed energy power in the food. First, a certain frequency for the generator 51 is fixed: at that frequency, the distance is changed in order to determine the distance at which the absorption of food energy power is maximum and the power losses in the cavity are minimum. Typically, a certain security degree (of for example 10%) is taken when establishing the distance and frequency at which the system will work, in order to ensure that no damage will occur to the devices.

As shown in the diagram of FIG. 4, the RF generator 51 is moved out of the cooking zone and the frequency is set at the centre of its frequency range, with a power set at 50% of its full power capacity. Then, a certain distance is adjusted between the cooking means 50 and the food substrate, for example 8 mm. The RF generator is moved over on top of the food deposited and the reflected power is monitored: a frequency sweeping is done around the centred frequency, and then the frequency at which the power lost is maximum is selected. After this, the RF generator 51 is shifted to its central frequency (2.45 GHz) to minimize power losses. Then, the cooking process starts with the defined optimal parameters set.

Figure 5A:
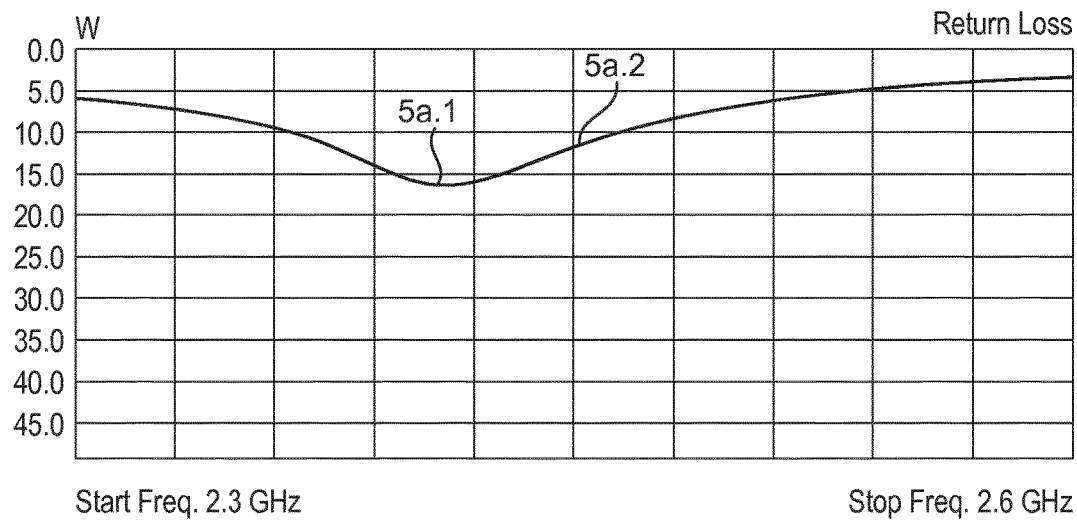
FIG. 5a shows a graph representing the variation of return losses when the frequency varies, the antenna being arranged at a distance of 8 mm from the food substrate.

In a more detailed way, looking now at the graph in FIG. 5*a*, a scanning in frequency is represented in the X axis, while the return power losses (difference between emitted power and reflected power, thus providing the information on the power effectively absorbed by the food substrate) are shown in axis Y. For this graph, the antenna (generator 51) is placed at 8 mm from the food substrate. The frequency scanning starts at 2.3 GHz and ends at 2.6 GHz. In this graph, point 5*a*.2 shows the central range frequency of 2.455 GHz, while 5*a*.2 represents the value where the return power losses are maximum, thus representing the value where the power absorption by the food is maximum (in the graph, this value takes place at 2.409 GHz).

Figure 5B:
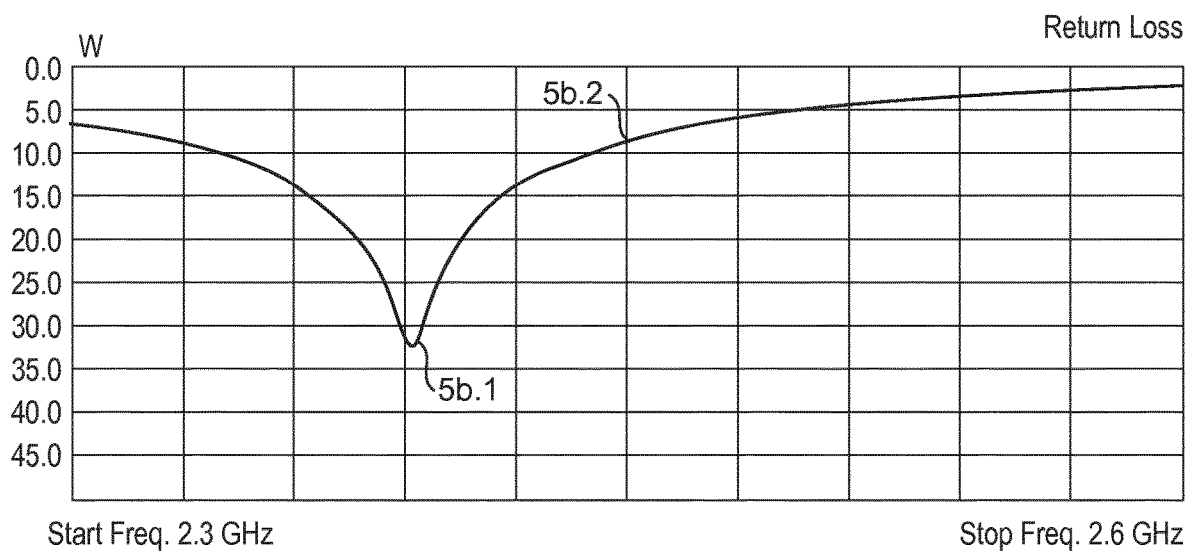
FIG. 5b shows a graph representing the variation of return losses when the frequency varies, the antenna being arranged at a distance of 5 mm from the food substrate.
Figure 5C:
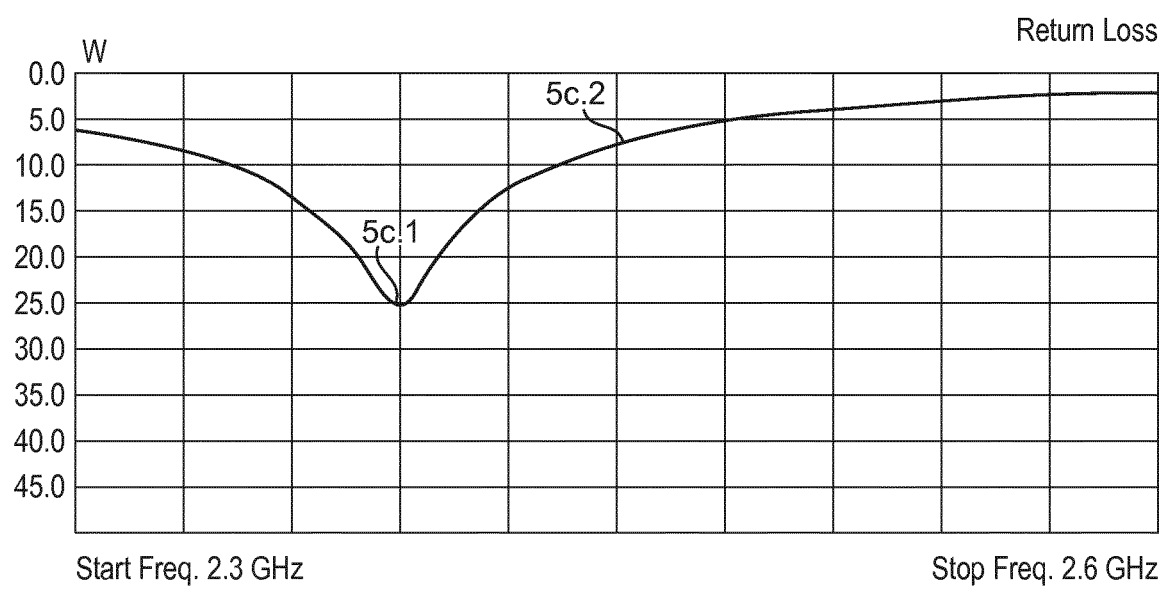
FIG. 5c shows a graph representing the variation of return losses when the frequency varies, the antenna being arranged at a distance of 3 mm from the food substrate.

Looking at the graph in FIG. 5*b*, similar scanning frequency takes place but keeping the antenna at a distance of 5 mm from the food substrate: at the frequency of 2.409 GHz where the return losses were maximum (FIG. 5*a*), the return losses at the new antenna distance of 5 mm are now lower. In FIG. 5*b*, the point 5*b*.2 shows the central frequency of 2.455 GHz, and 5*b*.1 represents the frequency at which the return power losses are maximum (2.392 GHz for this case). A further scanning takes place, as shown in FIG. 5*c*, placing the antenna at 3 mm from the food substrate: the frequency of 2.392 GHz that provided maximum return losses at 5 mm now provides much lower return loss: 5*c*.2 shows the central frequency of 2.455 GHz and 5*c*.1 shows the frequency at which the absorbed power is maximum (2.389 GHz in this case). Thus, the optimal set up (for the food material scanned in these graphs) is at a frequency of 2.392 GHz and a distance of 5 mm.

Depending on the food material, the values and graphs obtained will be different, and such a pre-setting before starting the cooking process is necessary. In the case of the food material which was used for the FIGS. 5*a-b-c*, the maximum of power absorption (i.e. maximum return losses) is obtained for a distance of 5 mm between the antenna and the food surface, as already discussed. Therefore, the initial setting of the antenna before the starting of the cooking process is at 5 mm from the food substrate. Thus, there are two parameters to set before starting the cooking process in a food processing system 100: the frequency of the waveguide and the distance of the antenna to the food substrate.

Therefore, in order to fix the set up parameters before starting the cooking process (frequency of the generator 51 and distance of the antenna to the deposited food on the surface 20) a first frequency at the centre of the frequency range is set and an exemplary distance is also set depending on the waveguide design: these are starting values of the cooking parameters. A first scanning of frequency is done, at a certain distance, and the frequency value at which the return loss is maximum is taken. At this frequency value, the distance of the antenna to the deposited food is varied in order to determine the optimal distance value, at said frequency, providing maximum return losses (i.e. maximum food absorption). Then, the cooking process can start, once these two values (frequency and distance) are set.

Once the cooking process has started and takes place, the food material changes its properties with time, as the said cooking process moves on. In fact, the food grows in height so the distance to the antenna is not the same as when the process started and the nature of the food material (water content, dielectric properties) also change with time. For this reason, further adjustments of the setup parameters of the cooking system may be needed with time, during the cooking process.

As seen above, the optimal distance between the waveguide and the food surface has been set: during the cooking process, this distance will have to be kept constant. For this purpose, a servo system (control means 41) has been developed and the distance regulation is achieved by using a distance sensor (optical, ultrasound, etc.) which is located adjacent of the waveguide (sensing means 40).

During the cooking process it will be required to control the shift of frequency induced by the phase change (jellification, crystallisation, etc.) of the food material and the loss of water, as these effects affect the dielectric properties of the food which then impact the transmission of the RF energy towards the food material.

Figure 6:
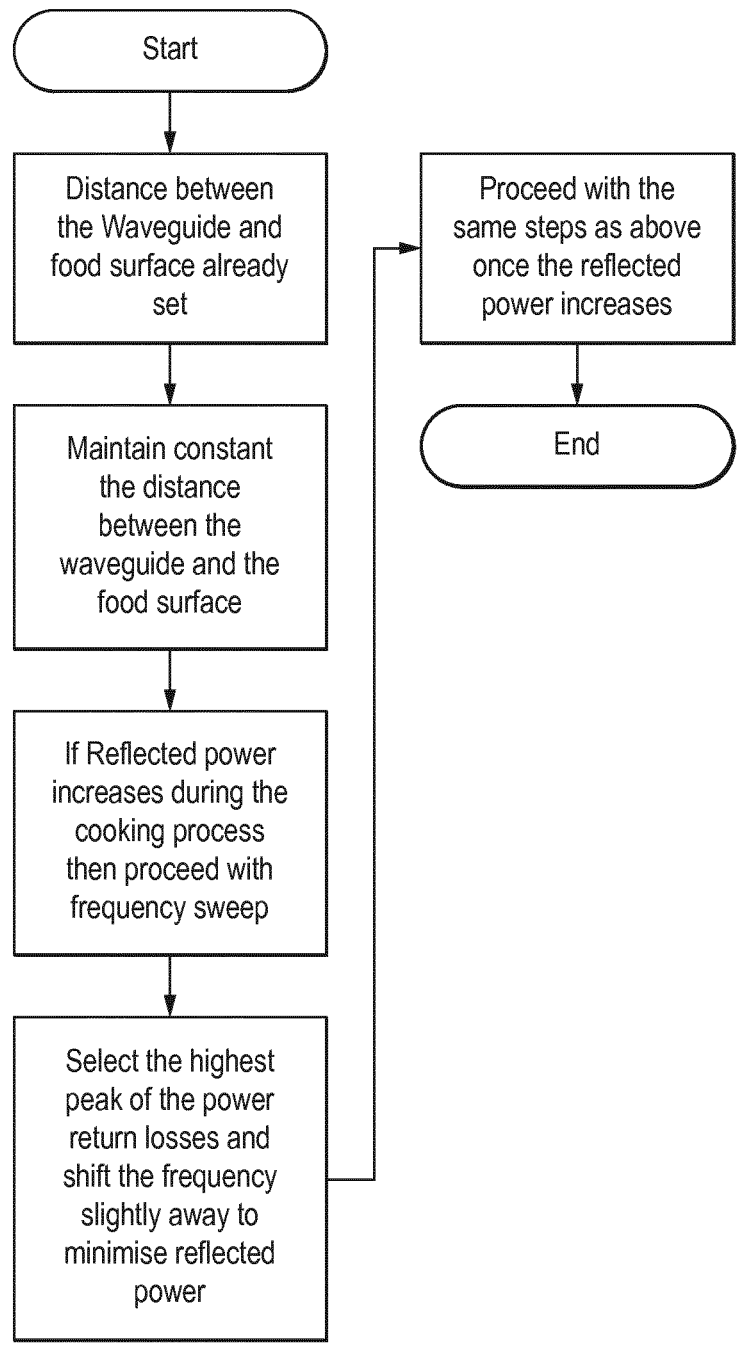
FIG. 6 shows a diagram representing the main steps to be carried out for adjusting the parameters of the system during the cooking process in a method for preparing a foodstuff according to the present invention.

FIG. 6 shows a diagram with the main steps followed by the food processing system 100 when the cooking process takes place. First, a distance and a frequency has been set for the radio frequency cooking system 51: the distance is maintained constant during the cooking process, while the reflected power is monitored: if the reflected power increases during the cooking process, a frequency sweep is needed to select (as already done in the initial system set up) the frequency at which the return losses are maximum: typically, the distance of the antenna to the food substrate is maintained constant and the frequency is shifted when the reflected power increases during the cooking process. Another possibility would be to effect a new scanning of frequency at different distances, and re-set the parameters of the system once again, i.e. both distance of the antenna to the food substrate and the frequency. A more preferred solution though is to keep the distance and shift only the frequency.

The processes indicated above refer to the cooking means 50, in particular to the solid state radio frequency cooking system 51: the secondary cooking means 60 placed below the deposition surface 60 maintained a fixed distance with respect to the food deposited and, therefore, do not require any distance adjustment.

During the cooking process, the distance between the antenna and the deposited food is maintained substantially constant, at the distance providing an optimal (higher) food power absorption (as the layers of food grow, a servo system or control means 41 will move the cooking means 50 higher in order to keep the optimal distance set constant). During the cooking process, the dielectric properties of the food change with time (phase change, water loss, etc.) so the absorption of the power by the food material changes with time. Typically, in order to maintain an optimal food absorption, keeping the distance as set at the beginning, the solid state radio frequency means 51 will shift its frequency to adapt it to the food material properties change, and still maintain maximum return losses.

Using a high power infrared emitter 52 in combination with the RF cooking means 51 will be required when a surface browning or the formation of a crusty layer is required. Due to the variability of the food material over the seasons and globe regions, a fixed cooking process time cannot be reliably applied when using the infrared cooking means 52. Indeed, the risk is to obtain a carbonized layer if too much heat has been applied for a long period of time or a non-crusty layer if there is a lack of cooking time. As the food processing system of the invention is fully automatic, the browning of the food surface will be monitored with time: the system 100 will typically be equipped with a colour camera that will monitor the cooking propensity of the food surface; the variation of the food surface colour will be monitored and when a defined threshold will be reached, the cooking process will be stopped automatically.

The camera can be either placed on the cooking means support 91 or in the machine cavity with an angle that will allow to monitor the colour of the food surface. Appropriate illumination will be required to obtain the qualitative information of the colour.

Figure 7:
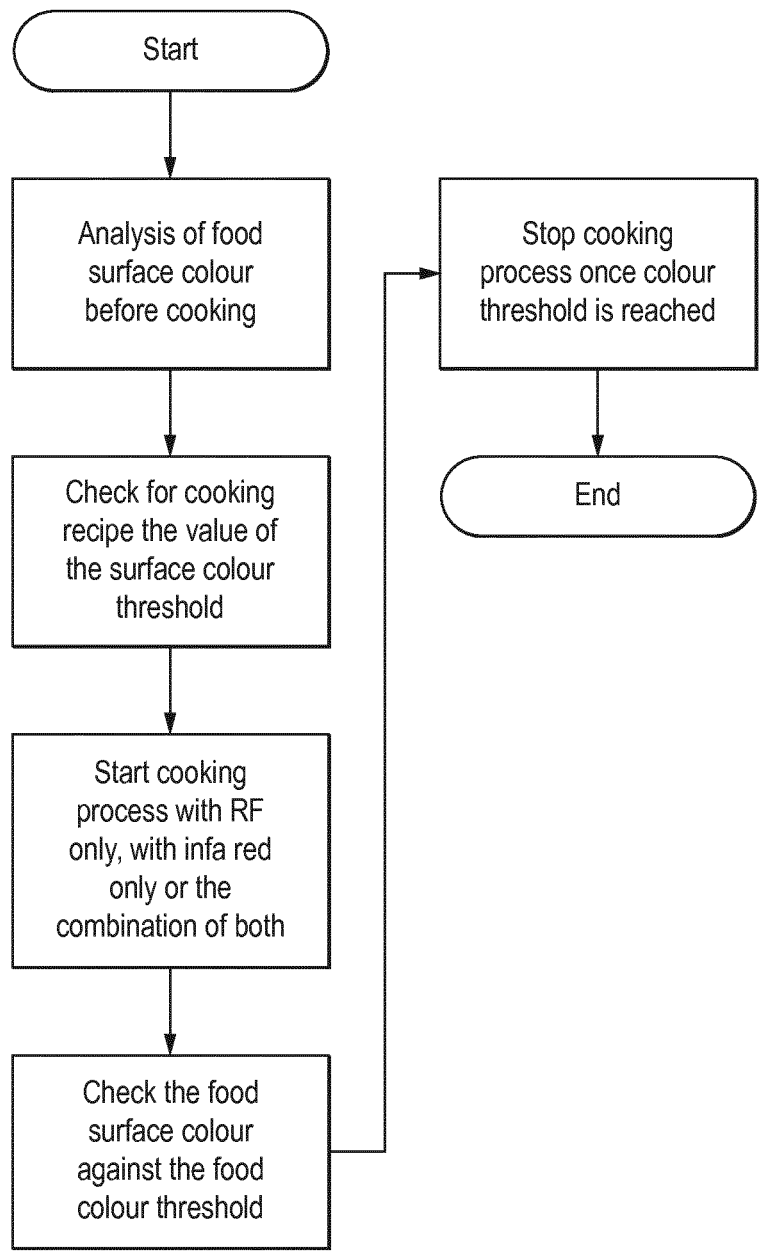
FIG. 7 shows a diagram representing the main steps to be carried out for food surface monitoring during the cooking process in a method for preparing a foodstuff according to the present invention.

An exemplary diagram showing the different steps used for the surface monitoring and the control of the surface browning or surface crystallization when using the infrared cooking (alternatively, a hot air stream can also be used as browning means) is shown in FIG. 7 attached.

At the start of the process, before the cooking, the food surface colour is analysed: depending on the recipe desired, a certain surface colour threshold value is set. The cooking process takes place with RF only, with infrared only or with the combination of both: a monitoring system (colour camera) checks the food surface colour and compares it with the desired threshold: once the colour threshold is reached, the cooking process is stopped.

Preferably, the lower food layer is overcooked or browned by means of activation of the secondary cooking means 60. The rest of the layers deposited are usually not browned on the surface but the last layer on top is. The final configuration provides top and bottom layers browned that seal and maintain a certain water/moisture level in the inside (intermediate) layers deposited between the top and bottom ones.

Although the present invention has been described with reference to preferred embodiments thereof, many modifications and alternations may be made by a person having ordinary skill in the art without departing from the scope of this invention which is defined by the appended claims.

The invention claimed is:

1. A method for preparing a foodstuff in a food processing system, the food processing system comprising a solid state radio frequency cooking member and a cavity, the solid state radio frequency cooking member is configured to transmit an electromagnetic wave to a food substrate and the cavity where the food substrate is cooked, the method comprising:
   (i) initially pre-setting the solid state radio frequency cooking member at a first emitted frequency from a plurality of emitted frequencies and a first distance to the food substrate from a plurality of distances, the initial pre-setting comprising:
      scanning the plurality of emitted frequencies of the solid state radio frequency cooking member at at least one of the plurality of distances of the solid state radio frequency cooking member to the food substrate;
      monitoring a return power loss, which is a difference between a power emitted by the solid state radio frequency cooking member and a reflected power in the cavity, for each of the plurality of emitted frequencies;
      setting one of the plurality of emitted frequencies at which the return power loss is maximum as the first emitted frequency;
      adjusting a position of the solid state radio frequency cooking member to each of the plurality of distances to the food substrate; and
      setting one of the plurality of distances at which the return power loss is maximum as the first distance; and
      pre-setting the solid state radio frequency cooking member at the first emitted frequency and the first distance to the food substrate;
   (ii) activating the solid state radio frequency cooking member for cooking the food substrate;
   (iii) monitoring the return power loss; and
   (iv) controlling and adjusting the first emitted frequency of the solid state radio frequency cooking member to a second emitted frequency of the solid state radio frequency member, and the first distance of the solid state radio frequency cooking member to the food substrate to a second distance of the solid state radio frequency cooking member to the food substrate, to optimize a delivery of a radio frequency power to the food substrate.

2. The method for preparing the foodstuff according to claim 1, further comprising continuously monitoring dielectric properties, a water content and/or compaction of the food substrate throughout the preparation of the foodstuff.

3. The method for preparing the foodstuff according to claim 1, further comprising reconstituting an intermediate food from a powdered raw food material using the food processing system; depositing the intermediate food in the cavity to form the food substrate in one layer or layer by layer in a plurality of layers; and activating the solid state radio frequency cooking member simultaneously or successively to the deposition of the one layer or the plurality of layers.

4. The method for preparing the foodstuff according to claim 1, wherein the initial pre-setting is repeated several times.

5. The method for preparing the foodstuff according to claim 1, wherein the distance from the solid state radio frequency cooking member to the food substrate is maintained substantially constant throughout the preparation of the foodstuff.

6. The method for preparing the foodstuff according to claim 5, wherein the first distance from the cooking member to the food substrate is the one of the plurality of distances which provides maximum return power losses, at the first emitted frequency of the cooking member.

7. The method for preparing the foodstuff according to claim 5, wherein the solid state radio frequency cooking member is configured to shift the first emitted frequency to adapt to a change of food substrate properties throughout the preparation of the foodstuff, so as to maintain maximum return power losses.

8. The method for preparing the foodstuff according to claim 1, further comprising monitoring variation of a surface color of the food substrate; and stopping the preparation of the foodstuff once a certain defined threshold of the variation of the surface color of the food substrate is reached.

9. The method for preparing the foodstuff according to claim 1, wherein the food processing system comprises at least a deposition head and a deposition area, the deposition head depositing the food substrate onto the deposition area, and wherein the method comprises depositing the food substrate in one layer or a plurality of layers onto the deposition area using the deposition head; and adjusting the distance of the solid state radio frequency cooking member to the deposition area by relatively moving the solid state radio frequency cooking member and the deposition area in height.

10. The method for preparing the foodstuff according to claim 9, wherein the food processing system further comprises a secondary cooking member, wherein the food substrate is deposited in the plurality of layers onto the deposition area, and wherein the method comprises activating the secondary cooking member to cook and/or brown a first bottom layer of the plurality of layers deposited.

11. The method for preparing the foodstuff according to claim 9, wherein the food processing system further comprises an infrared generator, wherein the food substrate is deposited in the plurality of layers onto the deposition area, and wherein the method comprises activating the infrared generator for browning a top last layer of the plurality of layers deposited.

12. The method for preparing the foodstuff according to claim 9, wherein the food processing system further comprises a secondary cooking member and an infrared generator, wherein the food substrate is deposited in the plurality of layers onto the deposition area, and wherein the method comprises activating the secondary cooking member to cook and/or brown a first bottom layer of the plurality of layers deposited, and further activating the infrared generator for browning a top last layer of the plurality of layers deposited.

13. The method for preparing the foodstuff according to claim 9, wherein the deposition head is configured to attach to and move together with the solid state radio frequency cooking member.

14. The method for preparing the foodstuff according to claim 9, wherein the deposition head is configured to move separately from the solid state radio frequency cooking member.

15. The method for preparing the foodstuff according to claim 1, wherein the food processing system further comprises an infrared generator, and wherein the method comprises selectively activating the infrared generator throughout the preparation of the foodstuff for browning at least part of the foodstuff.

16. The method for preparing the foodstuff according to claim 15, wherein the food processing system further comprises a secondary cooking member, wherein the food processing system is configured to deposit the foodstuff in a plurality of layers on a deposition area of the food processing system, and wherein the method comprises activating the secondary cooking member for cooking and/or browning a first bottom layer of the plurality of layers deposited, and further activating the infrared generator for browning a top last layer of the plurality of layers deposited.

17. The method for preparing the foodstuff according to claim 1, wherein the food processing system further comprises a secondary cooking member to cook a lower surface of the foodstuff, and wherein the method comprises selectively activating the secondary cooking member for cooking and/or browning at least part of the lower surface of the foodstuff.

18. The method for preparing the foodstuff according to claim 17, wherein the secondary cooking member comprises at least one planar microwave antenna.

19. The method for preparing the foodstuff according to claim 17, wherein the secondary cooking member comprises at least one electrical heating resistor.

* * * * *